(12) United States Patent
Murata

(10) Patent No.: US 7,687,420 B2
(45) Date of Patent: Mar. 30, 2010

(54) TEMPERED GLASS AND PROCESS FOR PRODUCING THE SAME

(75) Inventor: Takashi Murata, Otsu (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 0 days.

(21) Appl. No.: 11/802,924

(22) Filed: May 25, 2007

(65) Prior Publication Data

US 2008/0020919 A1     Jan. 24, 2008

(30) Foreign Application Priority Data

May 25, 2006   (JP)            P.2006-145375

(51) Int. Cl.
     *C03C 3/083*       (2006.01)
     *C03C 3/091*       (2006.01)
     *C03C 3/085*       (2006.01)
     *C03C 15/00*      (2006.01)

(52) U.S. Cl. .............................. 501/68; 501/66; 501/69; 65/30.14

(58) Field of Classification Search .................... 501/66, 501/68, 69, 70, 67; 65/30.14

See application file for complete search history.

(56) References Cited

U.S. PATENT DOCUMENTS 5,972,460 A * 10/1999 Tachiwana ................. 428/64.2
6,413,892 B1 * 7/2002 Koyama et al. ............... 501/64

FOREIGN PATENT DOCUMENTS

| JP | 1-239036 | 9/1989 |
|----|----------|--------|
| JP | 10-1329 | 1/1998 |
| JP | 11-232627 | 8/1999 |
| JP | 2002-174810 | 6/2002 |
| JP | 2005-104773 | 4/2005 |
| JP | 2006-83045 | 3/2006 |
| JP | 2007-31211 | 2/2007 |

* cited by examiner

*Primary Examiner*—Karl E Group
*Assistant Examiner*—Noah S Wiese
(74) *Attorney, Agent, or Firm*—Drinker Biddle & Reath LLP

(57) ABSTRACT

The invention relates to a tempered glass comprising, in terms of mass percent, $SiO_2$: 60 to 80%; $Al_2O_3$: 3 to 18%; $B_2O_3$: 0 to 7%; $Li_2O$: 0.01 to 10%; $Na_2O$: 4 to 16%; $K_2O$: 0 to 15%; and R'O (wherein R'O indicates a total content of alkaline earth metal oxides): 0 to 5%, wherein a value of $(Li_2O+Al_2O_3)/(Na_2O+K_2O)$ in terms of molar ratio is within a range of 0.1 to 2, and wherein a surface of the tempered glass is treated to form a compressive stress layer.

17 Claims, No Drawings

TEMPERED GLASS AND PROCESS FOR PRODUCING THE SAME

FIELD OF THE INVENTION

The invention relates to a tempered glass and a process for producing the same.

BACKGROUND OF THE INVENTION

A tempered glass is used as a cover glass of a portable telephone, a digital camera, a PDA and so on, or as a substrate glass of a touch panel and so on. In recent years, these devices have become widely used, and accordingly, there is a strong demand for producing these in a large amount at low cost.

A glass substrate used in these applications is required to be high in the mechanical strength. In this connection, so-called chemically tempered glass that is tempered through an ion exchange process and the like has been proposed (for instance, see JP-A-2006-83045 and JP-A-2007-31211).

However, in conventional tempered glasses, it takes a long time to apply an ion exchange process to be high in cost. Furthermore, since devices such as portable telephones are required to be light in weight and small in size, glass substrates used in the devices are required to be thin in the thickness and low in the density. However, since conventional tempered glasses are inferior in the devitrification, only a process such as a roll forming process can be used, whereby it is difficult to form a thin sheet. Accordingly, a process such as polishing has to be applied after the formation to make thinner.

SUMMARY OF THE INVENTION

The invention intends to provide a glass that can be ion exchanged at a low temperature or in a short time and does not necessitate polishing; a lightweight tempered glass obtained by tempering the glass; and a process for producing the same.

As a result of intensive studies, the inventors found that, as the strain point of glass becomes lower, an ion exchange process can be applied at a lower temperature or in a shorter time, and when the devitrification of glass is improved and an overflow downdraw process is applied for forming the glass, the foregoing object can be achieved. Accordingly, the inventors have achieved the invention.

DETAILED DESCRIPTION OF THE INVENTION

That is, a tempered glass of the invention comprises, in terms of mass percent, $SiO_2$: 60 to 80%; $Al_2O_3$: 3 to 18%; $B_2O_3$: 0 to 7%; $Li_2O$: 0.01 to 10%; $Na_2O$: 4 to 16%; $K_2O$: 0 to 15%; and R'O (wherein R'O indicates a total content of alkaline earth metal oxides): 0 to 5%, wherein a value of $(Li_2O+Al_2O_3)/(Na_2O+K_2O)$ in terms of molar ratio is within a range of 0.1 to 2, and wherein a surface of the tempered glass is treated to form a compressive stress layer.

Furthermore, another tempered glass of the invention comprises, in terms of mass percent, $SiO_2$: 60 to 80%; $Al_2O_3$: 8 to 18%; $B_2O_3$: 0 to 5%; $Li_2O$: 0.01 to 10%; $Na_2O$: 4 to 14%; $K_2O$: 0.01 to 10%; and R'O (wherein R'O indicates a total content of alkaline earth metal oxides): 0 to 5%, wherein a value of $(Li_2O+Al_2O_3)/(Na_2O+K_2O)$ in terms of molar ratio is within a range of 0.5 to 2, and wherein a surface of the tempered glass is treated to form a compressive stress layer.

It is preferable that the tempered glass has a compressive stress layer of 300 MPa or more formed on a surface thereof, and that a thickness of the compressive stress layer is 5 μm or more. In the invention, a compressive stress value of a compressive stress layer and a depth of the compressive stress layer are measured with a surface stress meter.

The tempered glass is preferably made of a glass having a value of $Li_2O/(Na_2O+K_2O)$ within the range of 0.05 to 2 in terms of molar ratio.

The tempered glass is preferably made of a glass having a liquidus temperature of 1050° C. or less (in particular, 1000° C. or less). The liquidus temperature in the invention indicates a value measured as follows. In the beginning, after a glass is pulverized, a glass powder passed through a standard screen of 30 mesh (500 μm) and remained on a 50 mesh (300 μm) is prepared. Subsequently, glass powder thus obtained is put in a platinum boat, and maintained in a temperature gradient furnace for 24 hr, followed by observing the sample. The highest temperature at which crystals precipitate is taken as a liquidus temperature.

The tempered glass is preferably made of a glass having a liquidus viscosity of $10^{4.0}$ dPa·s or more (in particular, $10^{5.0}$ dPa·s or more). The liquidus viscosity in the invention indicates a value obtained as follows. In the beginning, a viscosity curve of the glass is prepared in advance. In the next place, the viscosity corresponding to the liquidus temperature obtained by the above method is obtained from the viscosity curve, and this value is taken as the liquidus viscosity.

The tempered glass preferably has a non-polished surface. In the invention, the non-polished surface means that main surfaces (top surface and bottom surface) of the glass are not polished, in other words, top and bottom surfaces thereof are fire finished surfaces. An end surface portion thereof may be chamfered.

The tempered glass preferably has a plate thickness of 1.5 mm or less.

Additionally, a process for producing a tempered glass according to the invention comprises: melting glass raw materials blended so as to have a glass composition within a range of, in terms of mass percent, $SiO_2$: 60 to 80%, $Al_2O_3$: 3 to 18% (preferably 8 to 18%), $B_2O_3$: 0 to 7% (preferably 0 to 5%), $Li_2O$: 0.01 to 10%, $Na_2O$: 4 to 16% (preferably 4 to 14%), $K_2O$: 0 to 15% (preferably 0.01 to 10%) and R'O (wherein R'O expresses a total content of alkaline earth metal oxides): 0 to 5%, wherein a ratio of $(Li_2O+Al_2O_3)/(Na_2O+K_2O)$ in terms of molar ratio is within a range of 0.1 to 2 (preferably 0.5 to 2), followed by forming them into sheet; and then conducting an ion exchange process to form a compressive stress layer on a surface of said glass sheet.

Furthermore, a still another glass of the invention comprises: in terms of mass percent, $SiO_2$: 60 to 80%; $Al_2O_3$: 3 to 18% (preferably 8 to 18%); $B_2O_3$: 0 to 7% (preferably 0 to 5%); $Li_2O$: 0.01 to 10%; $Na_2O$: 4 to 16% (preferably 4 to 14%); $K_2O$: 0 to 15% (preferably 0.01 to 10%); and R'O (wherein R'O indicates a total content of alkaline earth metal oxides): 0 to 5%, wherein a value of $(Li_2O+Al_2O_3)/(Na_2O+K_2O)$ in terms of molar ratio is within a range of 0.1 to 2 (preferably 0.5 to 2).

The tempered glass of the invention is low in the strain point and can be ion exchanged at low temperatures. When it is processed at a high temperature same as that of the conventional cases, it does not take a long time for an ion exchange process. Furthermore, since the tempered glass of the invention is excellent in the devitrification and can be formed by the overflow downdraw process, there is no need of a polishing process after the formation thereof. Accordingly, the tempered glass of the invention can be produced in a large amount at low cost.

Furthermore, due to the low contents of alkaline earth metal oxide components, the density of the tempered glass of the invention is low. In addition, the tempered glass of the invention can be formed by the overflow downdraw process. Therefore, the plate thickness of the tempered glass of the invention can be made thinner. Accordingly, the glass can be readily saved in weight and thereby a device can be saved in weight.

According to the process of the invention, a tempered glass that is high in the mechanical strength, thin in thickness and light in weight can be produced in a large amount at low cost. Accordingly, the production process of the invention is preferable as a process for producing tempered glass that is used in cover glasses of portable telephones, digital cameras, PDAs, displays and solar batteries and so on, or substrate glasses of touch panel displays and so on.

The glass of the invention does not require a long time for an ion exchange process. Furthermore, the glass of the invention is excellent in the devitrification and can be formed by means of an overflow downdraw process in a large amount at low cost. Accordingly, the glass of the invention is suitable as glass for tempering by means of an ion exchange process.

The tempered glass of the invention has the following features.

(1) The glass can be produced in a large amount at low cost.
(2) The glass can be readily saved in weight.

That is, since the tempered glass of the invention is constituted of glass excellent in devitrification, it can be formed by the overflow downdraw process. In the case of glass poor in the devitrification, only a roll forming process or a float process can be used for forming the glass, and therefore, a polishing process is necessary for thinning. On the other hand, when the overflow downdraw process can be used for forming the glass, the polishing process becomes unnecessary to thereby result in a decrease in the cost. Saving the polishing process is advantageous as well in obtaining a glass having high strength. That is, although theoretical strength of a glass is intrinsically very high, the glass is broken at a stress value far lower than the theoretical strength in many cases. This is because a small flaw called Griffith flaw is formed on a glass surface owing to a process after forming such as the polishing. Accordingly, when the overflow downdraw process is adopted, the polishing process can be omitted, resulting in readily maintaining the strength intrinsic to the glass. Furthermore, the overflow downdraw process is a process suitable for forming thin sheet glass. Since the glass of the invention can be processed according to this process, thinning thereof can be achieved and weight saving thereof can be readily achieved.

One of important conditions when glass can be processed according to the overflow downdraw process is to be excellent in devitrification. Specifically, it is preferable that the liquidus temperature is 1050° C. or less, in particular, 1000° C. or less, and the liquidus viscosity is $10^{4.0}$ dPa·s or more, in particular, $10^{5.0}$ dPa·s or more.

Furthermore, in the tempered glass of the invention, an ion exchange process (chemical tempering) is applied to form a compressive stress layer on a surface thereof In order to efficiently apply the ion exchange process, the tempered glass of the invention contains alkali metal oxide components and $Al_2O_3$. Among the alkali metal oxide components, $Li_2O$ and $K_2O$ per se are ion exchange components. Furthermore, the alkali metal oxide components have an effect of lowering the strain point of the glass, resulting in enabling to apply an ion exchange process at a lower temperature or in a shorter time.

When the contents of $Li_2O$ and $Al_2O_3$ are increased, the ion exchange performance can be greatly improved. However, in a compositional system of the invention, when the contents thereof become too high, the devitrification of the glass is deteriorated. That is, since the liquidus temperature becomes too high or the liquidus viscosity becomes too low, it becomes impossible to form the glass by the overflow downdraw process. In this connection, the optimum ratio of alkali metal oxide components, which are ion exchange components, and $Al_2O_3$, is obtained to thereby enable to combine the compressive stress layer formation at a low temperature or in a short time and the formation of the glass by the overflow downdraw process.

Additionally, when the glass can be melted at a lower temperature, melting of the glass can be readily performed to further reduce the production cost. From the point of view, a temperature of glass at the viscosity of $10^{2.5}$ dPa·s is preferably set at 1630° C. or less.

Furthermore, the tempered glass of the invention can be readily lowered in the density thereof As a factor of increasing the density, inclusion of the alkaline earth metal oxide components may be mentioned. In the tempered glass of the invention, when the alkaline earth metal oxide components are contained in a large amount, a depth of the compressive stress layer tends to be shallower. Furthermore, in such a case, the devitrification of the glass becomes deteriorated, whereby the overflow downdraw process becomes difficult to be adopted. Accordingly, in the invention, contents of the alkaline earth metal oxide components are limited, resulting in readily lowering the density of the glass. The preferable range of the density of the glass is 2.5 g/cm³ or less.

Still furthermore, the tempered glass of the invention can be provided with, in addition to the above, features below.

(3) The tempered glass has a high mechanical strength and is difficult to bend as a glass substrate.
(4) The tempered glass has the thermal expansion coefficient in conformity with that of peripheral materials.

When a glass substrate tends to bend, in devices such as touch panels, when a display is pressed with a pen or the like, a liquid crystal element inside of the device may be pressed to cause display fault. In order to make the glass difficult to bend, the Young's modulus of the glass is desirably 70 GPa or more. From the viewpoint of the strength of the glass, the crack incidence is desirably 60% or less. In order to make the Young's modulus higher, contents of $Al_2O_3$ and alkaline earth metal oxides components may be increased or ZnO, $ZrO_2$ and rare earth elements may be added. In order to lower the crack incidence, as will be mentioned below, contents of alkali metal oxide components may be increased and a ratio thereof may be controlled in an appropriate range.

When the thermal expansion coefficient of the glass is not in conformity with that of peripheral materials, there is care of a problem in that the glass substrate may be peeled off. For instance, when the glass substrate is applied as a cover glass, there are a metal and an organic material such as an adhesive in the surroundings thereof Accordingly, in the case that the thermal expansion coefficient of the glass is not in conformity with that of the metal and organic material, when an organic adhesive is used for adhesion, the glass substrate peels. In order to readily make the thermal expansion coefficient of the glass in conformity with that of the peripheral material, the glass desirably has a thermal expansion coefficient in the range of $70 \times 10^{-7}$ to $100 \times 10^{-7}$/° C. in a temperature range of 30 to 380° C. In the invention, in order to increase the thermal expansion coefficient of the glass, contents of alkali metal oxide components and alkaline earth metal oxide components may be increased and contents of $SiO_2$ and $Al_2O_3$ may be lowered. Furthermore, in order to lower the thermal expansion coefficient thereof, contents of alkali metal oxide components and alkaline earth metal oxide components may be decreased and contents of $SiO_2$ and $Al_2O_3$ may be increased.

Components such as $Al_2O_3$, alkaline earth metal oxides, ZnO, $ZrO_2$ and rare earth elements are likely to deteriorate the devitrification of the glass. Furthermore, the alkaline earth metal oxide components and ZnO tend to make the crack incidence higher. Accordingly, when the contents of these components are determined, it is important to fully consider a balance between the respective components.

In the followings, the invention will be described in detail.

In the beginning, with regard to the glass of the invention and the tempered glass of the invention obtained by tempering the glass of the invention, the reasons for restricting the content of each component as mentioned above are described as follows.

Herein, in the present specification, unless otherwise indicated, all the percentages mean mass percent and mass percent is synonymous with weight percent.

The content of $SiO_2$ is in the range of 60 to 80%. When the content of $SiO_2$ is increased, it becomes difficult to melt and form the glass and the thermal expansion coefficient becomes too small to thereby become difficult to be consistent with the peripheral materials. On the other hand, when the content thereof is small, the thermal expansion coefficient becomes larger and the thermal shock resistance of the glass becomes deteriorated. Furthermore, the glass becomes difficult to be vitrified and the devitrification becomes deteriorated. A preferable range of $SiO_2$ is, by the upper limit, 78% or less, 77% or less, 75% or less, particularly, 73% or less and, by the lower limit, 63% or more, 65% or more and, particularly, 67% or more.

The content of $Al_2O_3$ is in the range of 3 to 18%. $Al_2O_3$ is effective in improving the heat resistance, ion exchange performance and the Young's modulus of the glass. However, when the content of $Al_2O_3$ is increased, devitrified crystal tends to precipitate in the glass, the thermal expansion coefficient becomes smaller to be difficult to be consistent with peripheral materials and the viscosity at high temperature becomes higher. The upper limit of a preferable range of $Al_2O_3$ is 17% or less, 16% or less, 15% or less, and, in particular, 14% or less, and the lower limit thereof is 4% or more, 5% or more, in particular when the ion exchange performance is desired to be improved, 8% or more, 9% or more, 10% or more, 11% or more and in particular 12% or more.

The content of $B_2O_3$ is in the range of 0 to 7%. $B_2O_3$ has an effect of lowering the liquidus temperature, the viscosity at high temperature and the density. However, when the content of $B_2O_3$ becomes increased, there is fear that a stain may be caused on a surface owing to the ion exchange. Furthermore, in some cases, the strain point is excessively lowered, whereby there is fear that the stress relaxation tends to proceed during the ion exchange process and desired compressive stress cannot be obtained. The content of $B_2O_3$ is preferably, by the upper limit, 5% or less, 4.5% or less, 4% or less and 3% or less, and, by the lower limit, 0.1% or more, 0.5% or more and 1% or more.

The content of $Li_2O$ is in the range of 0.01 to 10%. $Li_2O$ is an ion exchange component and simultaneously a component that makes the viscosity of glass at high temperature lower to thereby heighten the meltability and formability and makes the strain point of the glass lower. Furthermore, it has a large effect of lowering the crack incidence. However, when the content of $Li_2O$ is excessively large, the glass tends to be devitrified and the thermal expansion coefficient becomes larger. Accordingly, the thermal shock resistance may be lowered and the thermal expansion coefficients of the glass may be difficult to be consistent with the that of the peripheral materials. A preferable range of $Li_2O$ is, by the upper limit, 8% or less, 7% or less, 6% or less, 5% or less, and, in particular, 3% or less, and, by the lower limit, 0.5% or more, 1% or more and, in particular, 1.5% or more.

The content of $Na_2O$ is in the range of 4 to 16%. $Na_2O$ is an ion exchange component and simultaneously makes the viscosity of glass at high temperature lower to thereby heighten the meltability and formability, decreases the crack incidence and makes the strain point of the glass lower. Furthermore, it is a component that can improve the devitrification. However, when the content of $Na_2O$ is increased, the thermal expansion coefficient becomes excessively large, whereby the thermal shock resistance of glass becomes lower and it becomes difficult to be consistent with the thermal expansion coefficients of the peripheral materials. Still furthermore, when the content thereof is too large, conversely, the devitrification tends to be deteriorated. A preferable range of $Na_2O$ is, by the upper limit, 15% or less, 14% or less, 11% or less, 10% or less, and, in particular, 9% or less, and, by the lower limit, 5% or more, 6% or more and, in particular, 7% or more.

The content of $K_2O$ is in the range of 0 to 15%. $K_2O$ promotes an ion exchange process and makes the depth of the compressive stress layer deeper. Furthermore, it makes the viscosity of glass at high temperature lower to thereby heighten the meltability and formability, decreases the crack incidence and makes the strain point of the glass lower. Furthermore, it is also a component that improves the devitrification. However, when the content of $K_2O$ is increased, the thermal expansion coefficient becomes too large, whereby the thermal shock resistance of the glass becomes lower and it becomes difficult to be consistent with the thermal expansion coefficients of the peripheral materials. Furthermore, when it is contained excessively, conversely, the devitrification is deteriorated. A preferable range of $K_2O$ is, by the upper limit, 10% or less, 9% or less, 8% or less, 7% or less, 6.5% or less, and, in particular, 6% or less, and, by the lower limit, 0.01% or more, 0.5% or more, 1% or more, 2% or more, 3% or more, and, in particular, 4% or more.

When the total content of alkali metal oxide components ($Li_2O$, $Na_2O$ and $K_2O$) are increased, the glass tends to be devitrified and it becomes difficult to form the glass by the overflow downdraw process. Furthermore, the thermal expansion coefficient becomes too large, whereby the thermal shock resistance of the glass becomes deteriorated and it becomes difficult to be consistent with the thermal expansion coefficients of the peripheral materials. Still furthermore, in some cases, the strain point is excessively deteriorated. Accordingly, the total content of these components (hereinafter, referred to as $R_2O$) is desirably 20% or less, 18% or less and in particular 16% or less. On the other hand, when the content of $R_2O$ is too small, the ion exchange performance and the meltability are deteriorated and the crack incidence becomes higher. Accordingly, the content of $R_2O$ is desirably 4.1% or more, 5% or more, 9% or more and in particular 13% or more.

From the viewpoint of improving the ion exchange performance, the contents of $Li_2O$ and $Al_2O_3$ are better to be larger. On the other hand, from the viewpoint of improving the devitrification, the contents of $Li_2O$ and $Al_2O_3$ are better to be less and the contents of $Na_2O$ and $K_2O$ are better to be larger. In this connection, in the invention, as to a ratio of the components, a value of $(Li_2O+Al_2O_3)/(Na_2O+K_2O)$ in terms of molar ratio is controlled in the range of 0.1 to 2. When the value is set to 2 or less, the devitrification of the glass can be further improved. A more preferable range is 1.5 or less, 1.3 or less, and in particular 1.2 or less. On the other hand, when the value of $(Li_2O+Al_2O_3)/(Na_2O+K_2O)$ is excessively small, there is fear that the ion exchange performance is deteriorated. Furthermore, the devitrification and the meltability tends to be deteriorated and the crack incidence tends to increase. Furthermore, in the invention, the value of $(Li_2O+Al_2O_3)/(Na_2O+K_2O)$ is set at 0.1 or more. A more preferable value thereof is 0.5 or more, 0.7 or more and in particular 0.9 or more.

In order to reduce the crack incidence, in addition to the inclusion of the alkali metal oxide components, it is very important to control a ratio thereof in an appropriate range. Specifically, it is important that a value of $Li_2O/(Na_2O+K_2O)$ in terms of molar ratio is 0.05 or more, desirably, in particular, 0.1 or more, 0.15 or more, 0.2 or more and in particular 0.25 or more. However, when the value is excessively large, the devitrification owing to $Li_2O$ tends to be caused. Accordingly, the upper limit of the value of $Li_2O/(Na_2O+K_2O)$ is 2 or less, preferably 1.5 or less, 1.3 or less, 1.0 or less, 0.8 or less, 0.7 or less and in particular 0.5 or less.

The alkaline earth metal oxide components (MgO, CaO, SrO and BaO) are components that can be added with various objects mentioned below. However, when these components are contained a lot, in some cases, the density and thermal expansion coefficient become higher, the devitrification is deteriorated, the crack incidence becomes higher and the depth of the compressive stress layer after the ion exchange becomes shallower. Accordingly, the total content of these components (hereinafter, referred to as R'O) is preferably 5% or less, 3% or less, 1% or less, 0.8% or less, and in particular 0.5% or less.

MgO is a component that lowers the viscosity of the glass at high temperature to thereby heighten the meltability and formability and makes the strain point and the Young's modulus higher. Furthermore, among the alkaline earth metal oxide components, MgO is relatively higher in an effect of improving the ion exchange performance. However, when the content of MgO is increased, there is a trend that the density, thermal expansion coefficient and crack incidence become higher, the glass tends to be devitrified and phase separation is likely to be caused. Accordingly, the content thereof is desirably 5% or less, 3% or less, 1% or less, 0.8% or less and in particular 0.5% or less.

In the next place, CaO is a component that lowers the viscosity of the glass at high temperature to thereby heighten the meltability and formability and makes the strain point and the Young's modulus higher. Furthermore, among the alkaline earth metal oxide components, CaO is relatively higher in an effect of improving the ion exchange performance. However, when the content of CaO is increased, there is a trend that the density, thermal expansion coefficient and crack incidence become higher, the glass tends to be devitrified and the ion exchange performance tends to be deteriorated. Accordingly, the content thereof is desirably 5% or less, 3% or less, 1% or less, 0.8% or less, 0.5% or less and, ideally, substantially zero.

Then, SrO is a component that lowers the viscosity of the glass at high temperature to thereby heighten the meltability and formability and makes the strain point and the Young's modulus higher. However, when the content of SrO is increased, there is a trend that the density, thermal expansion coefficient and crack incidence become higher, the glass tends to be devitrified and the ion exchange performance tends to be deteriorated. Accordingly, the content thereof is desirably 5% or less, 3% or less, 1% or less, 0.8% or less, in particular 0.5% or less, and ideally substantially zero.

Then, BaO is a component that lowers the viscosity of the glass at high temperature to thereby heighten the meltability and formability and makes the strain point and the Young's modulus higher. However, when the content of BaO is increased, there is a trend that the density, thermal expansion coefficient and crack incidence become higher, the glass tends to be devitrified and the ion exchange performance tends to be deteriorated. Accordingly, the content thereof is desirably 5% or less, 3% or less, 1% or less, 0.8% or less, in particular 0.5% or less, and ideally substantially zero.

Furthermore, when a value obtained by dividing the total content of alkaline earth metal oxide components (R'O) by the total content of alkali metal oxide components ($R_2O$) becomes larger, there is a trend that the crack incidence becomes higher and the devitrification is deteriorated. Accordingly, the value is desirably 0.5 or less, 0.4 or less, 0.3 or less and 0.1 or less.

In the tempered glass of the invention, the total content of $SiO_2$, $Al_2O_3$, $B_2O_3$, $Li_2O$, $Na_2O$, $K_2O$ and R'O is desirably 90% or more and particularly 95% or more. When the total content of the components is less than 90%, it becomes difficult to obtain desired characteristics. The tempered glass of the invention may be constituted only of the components. However, within a range that does not largely damage the characteristics of the glass, other components (arbitrary components) may be added. Specifically, arbitrary components may be contained by 10% or less and particularly 5% or less. In the followings, arbitrary components will be exemplified.

In the beginning, ZnO is a component that lowers the viscosity of the glass at high temperature and improves the Young's modulus. Furthermore, the ion exchange performance as well can be improved. However, when the content of ZnO is increased, the thermal expansion coefficient becomes higher. Still furthermore, there is a trend that the glass tends to be devitrified, the crack incidence becomes higher and a phase separation is caused. Accordingly, the content thereof is desirably 10% or less, 8% or less, 5% or less, 4% or less, 3% or less and particularly 2.5% or less.

Then, $ZrO_2$ is a component that heightens the strain point and the Young's modulus and improves the ion exchange performance. However, when the content of $ZrO_2$ is increased, the devitrification is deteriorated. In particular, when the overflow downdraw process is used for forming the glass, there is a fear that at an interface with a formed body, grains are precipitated due to $ZrO_2$ to thereby lower the productivity during a long-term operation. Accordingly, the content of $ZrO_2$ is preferably 5% or less, 3% or less, 1.5% or less, 1% or less, 0.8% or less, 0.5% or less, and particularly 0.1% or less.

As a fining agent, at least one kind selected from the group consisting of F, Cl, $SO_3$, $Sb_2O_3$, $SnO_2$ and Ce may be added in an amount of 0 to 3%. As a more preferred combination of the fining agents, $SnO_2+Sb_2O_3+Cl$ are added in an amount of 0.001 to 2% and preferably 0.1 to 1%. When $SnO_2$ is used singularly, it is added in an amount of 0.05 to 1%, preferably 0.05 to 0.5% and more preferably 0.1 to 0.3%.

In order to achieve the long-term stability of a molten salt that is used in the ion exchange process, $TiO_2$ or $P_2O_5$ may be added in the range of not more than 5%, respectively. However, when the content of $TiO_2$ becomes too large, the glass is colored or deteriorated in the devitrification. Accordingly, the content of $TiO_2$ is preferably in the range of 0 to 4%, more preferably 0 to 2% and particularly 0 to 1%. Furthermore, when $P_2O_5$ is excessively contained, the glass causes the phase separation or the weather resistance is deteriorated. Accordingly, the content of $P_2O_5$ is preferably in the range of 0 to 4%, more preferably 0 to 2% and particularly 0 to 1%.

Then, rare earth element oxides such as $Nb_2O_5$ and $La_2O_3$ are components that increase the Young's modulus of the glass. However, raw materials thereof are expensive. Additionally, when these components are contained a lot, the devitrification is deteriorated, whereby it becomes impossible to form the glass by the overflow downdraw process. Accordingly, the total content of the rare earth element oxides should be limited to 3% or less, 2% or less, 1% or less, particularly 0.5% or less and ideally substantially zero.

In the invention, transition metal elements such as Co and Ni that strongly color the glass are not preferred because these elements deteriorate the transmittance. Specifically, usage amounts of raw materials or cullet are desirably controlled so that the contents thereof be 0.5% or less, 0.1% or less and particularly 0.05% or less.

Within the above-described composition ranges, preferred ranges of the respective components can be appropriately selected. In the followings, examples of preferable component ranges will be shown.

(i) In terms of mass percent, $SiO_2$: 60 to 80%, $Al_2O_3$: 3 to 18%, $B_2O_3$: 0 to 7%, $Li_2O$: 0.01 to 10%, $Na_2O$: 4 to 16%, $K_2O$: 0 to 15% and R'O: 0 to 5%, and a value of $(Li_2O+Al_2O_3)/(Na_2O+K_2O)$ in terms of molar ratio in the range of 0.1 to 2 and a value of $Li_2O/(Na_2O+K_2O)$ in terms of molar ratio in the range of 0.1 to 0.5.

(ii) In terms of mass percent, $SiO_2$: 60 to 80%, $Al_2O_3$: 3 to 18%, $B_2O_3$: 0 to 5%, $Li_2O$: 0.01 to 10%, $Na_2O$: 4 to 16%, $K_2O$: 0 to 15%, $R_2O$: 4.1 to 20%, R'O: 0 to 5%, and a value of $(Li_2O+Al_2O_3)/(Na_2O+K_2O)$ in terms of molar ratio in the range of 0.1 to 2 and a value of $Li_2O/(Na_2O+K_2O)$ in terms of molar ratio in the range of 0.1 to 0.5.

(iii) In terms of mass percent, $SiO_2$: 60 to 80%, $Al_2O_3$: 8 to 18%, $B_2O_3$: 0 to 5%, $Li_2O$: 0.01 to 10%, $Na_2O$: 4 to 14%, $K_2O$: 0.01 to 10%, R'O: 0 to 5% and a value of $(Li_2O+Al_2O_3)/(Na_2O+K_2O)$ in terms of molar ratio in the range of 0.5 to 2.

(iv) In terms of mass percent, $SiO_2$: 60 to 80%, $Al_2O_3$: 9 to 16%, $B_2O_3$: 0 to 5%, $Li_2O$: 0.01 to 10%, $Na_2O$: 4 to 14%, $K_2O$: 0.01 to 10%, R'O: 0 to 5%, and a value of $(Li_2O+Al_2O_3)/(Na_2O+K_2O)$ in terms of molar ratio in the range of 0.5 to 2 and a value of $Li_2O/(Na_2O+K_2O)$ in terms of molar ratio in the range of 0.1 to 0.8.

(v) In terms of mass percent, $SiO_2$: 63 to 78%, $Al_2O_3$: 9 to 16%, $B_2O_3$: 0 to 4.5%, $Li_2O$: 0.5 to 5%, $Na_2O$: 4 to 10%, $K_2O$: 0.5 to 6.5%, R'O: 0 to 5% and a value of $(Li_2O+Al_2O_3)/(Na_2O+K_2O)$ in terms of molar ratio in the range of 0.5 to 1.5 and a value of $Li_2O/(Na_2O+K_2O)$ in terms of molar ratio in the range of 0.1 to 0.5.

(vi) In terms of mass percent, $SiO_2$: 60 to 73%, $Al_2O_3$: 9 to 16%, $B_2O_3$: 0 to 5%, $Li_2O$: 0.5 to 5%, $Na_2O$: 4 to 10%, $K_2O$: 0.5 to 6.5%, MgO: 0 to 5%, $R_2O$: 5 to 18%, R'O: 0 to 5% and a value of $(Li_2O+Al_2O_3)/(Na_2O+K_2O)$ in terms of molar ratio in the range of 0.5 to 1.5 and a value of $Li_2O/(Na_2O+K_2O)$ in terms of molar ratio in the range of 0.1 to 0.5.

Glasses having the above-described compositions are low in the crack incidence. However, in particular, the crack incidence is preferably made so as to be 60% or less, 50% or less, 40% or less, 30% or less and particularly 20% or less.

Furthermore, in order that the glass may not be devitrified during forming the glass, in particular, during forming the glass according to the overflow downdraw process, the liquidus temperature of the glass is desirably controlled to 1050° C. or less, 1000° C. or less, 950° C. or less, 930° C. or less, and particularly 900° C. or less, and the viscosity at the liquidus temperature is desirably controlled to $10^{4.0}$ dPa·s or more, $10^{4.3}$ dPa·s or more, $10^{4.5}$ dPa·s or more, $10^{5.0}$ dPa·s or more, $10^{5.3}$ dPa·s or more, $10^{5.5}$ dPa·s or more, $10^{5.7}$ dPa·s or more, and particularly $10^{5.9}$ dPa·s or more.

Furthermore, in view of the consistency with thermal expansion coefficients of other members, the thermal expansion coefficient at the temperature in the range of 30 and 380° C. is preferably controlled to $70\times10^{-7}$ to $100\times10^{-7}/°$ C., $75\times10^{-7}$ to $95\times10^{-7}/°$ C., $75\times10^{-7}$ to $90\times10^{-7}/°$ C., $77\times10^{-7}$ to $88\times10^{-7}/°$ C. and particularly $80\times10^{-7}$ to $88\times10^{-7}/°$ C.

When the viscosity of the glass at high temperature is low, a load on a production unit is small and bubble quality tends to be excellent. Accordingly, from the viewpoint of producing at low cost, the viscosity of the glass at high temperature is preferred to be lower. Specifically, a temperature at $10^{2.5}$ dPa·s is desirably controlled so as to be 1630° C. or less, 1600° C. or less, 1550° C. or less and particularly 1500° C. or less.

Furthermore, when the specific Young's modulus (a value obtained by dividing the Young's modulus by the density) is high, the glass becomes difficult to bend. Accordingly, the specific Young's modulus is desirably 27 GPa/(g/cm$^3$) or more, 28 GPa/(g/cm$^3$) or more, 29 GPa/(g/cm$^3$) or more and 30 GPa/(g/cm$^3$) or more. The Young's modulus is desirably 70 GPa or more, 71 GPa or more and 73 GPa or more. Furthermore, the density is desirably 2.55 g/cm$^3$ or less, 2.5 g/cm$^3$ or less, 2.45 g/cm$^3$ or less and 2.4 g/cm$^3$ or less.

Still furthermore, as the strain point of the glass becomes lower, the ion exchange can be preferably carried out at a lower temperature or in a shorter time. Specifically, the strain point is desirably 580° C. or less, 550° C. or less and particularly 490° C. or less.

The tempered glass of the invention has a compressive stress layer on a glass surface, as well as having the above-mentioned composition. In the compressive stress layer, a magnitude of the compressive stress is desirably 300 MPa or more, 400 MPa or more, 500 MPa or more, 600 MPa or more and particularly 700 MPa or more. The larger the compressive stress is, the stronger the mechanical strength is Furthermore, a thickness of the compressive stress layer is desirably 5 μm or more, 10 μm or more, 18 μm or more, 20 μm or more, 25 μm or more, 30 μm or more and particularly 40 μm or more. As the thickness of the compressive stress layer becomes larger, even when a deep scratch is caused, the glass becomes difficult to break.

Furthermore, the tempered glass of the invention desirably has a non-polished surface. In a non-polished state, the tempered glass can be supplied at low cost. Furthermore, since there is no polishing flaw, the glass can readily maintain the intrinsic strength thereof.

Still furthermore, the tempered glass of the invention preferably has a plate thickness of 1.5 mm or less, 0.7 mm or less, 0.5 mm or less and particularly 0.3 mm or less. The thinner the plate thickness is, the lighter the glass sheet can be made.

In the next place, a process of the invention for producing the tempered glass will be described.

In the beginning, glass raw materials are compounded so as to be the above-described composition, followed by melting at a temperature in the range of 1500 to 1600° C. for melting.

Subsequently, molten glass is formed into sheet. In the forming, an overflow downdraw process is desirably adopted. When the overflow downdraw process is used, a thin sheet can be readily formed. Furthermore, since a glass sheet thin in the plate thickness and high in surface quality can be formed, a polishing process can be omitted.

Thereafter, the glass sheet thus obtained is subjected to an ion exchange (chemical tempering) process, whereby the tempered glass of the invention can be obtained. The ion exchange process can be applied, for instance, by dipping the glass sheet in a potassium nitrate solution at a temperature in the range of 400 to 550° C. for 1 to 8 hr. The ion exchange conditions can be appropriately selected with taking the viscosity characteristics of the glass into account.

EXAMPLES

In the followings, the invention will be described with reference to examples.

Tables 1 to 3 shows examples (sample Nos. 1 through 4 and 6 through 11) and comparative examples (sample Nos. 5 and 12).

TABLE 1

|  | 1 | | 2 | | 3 | | 4 | | 5 | |
|---|---|---|---|---|---|---|---|---|---|---|
|  | mass % | mol % | mass % | mol % | mass % | mol % | mass % | mol % | mass % | mol % |
| $SiO_2$ | 68.6 | 73.5 | 66.6 | 72 | 69.6 | 72.2 | 71.6 | 73.8 | 55.5 | 66.1 |
| $Al_2O_3$ | 13.3 | 8.4 | 12.9 | 8.2 | 12.9 | 7.9 | 12.9 | 7.8 | 7.0 | 4.9 |
| $B_2O_3$ | | | 1.5 | 1.4 | | | | | | |
| ZnO | 2.1 | 1.7 | 2 | 1.6 | 2.0 | 1.5 | | | | |
| $Sb_2O_3$ | 0.5 | 0.1 | 0.5 | 0.1 | 0.5 | 0.1 | 0.5 | 0.1 | | |
| $Li_2O$ | 1.9 | 4.1 | 1.8 | 3.9 | 4.0 | 8.3 | 4.0 | 8.3 | | |
| $Na_2O$ | 8.2 | 8.5 | 8 | 8.4 | 8.0 | 8.0 | 8.0 | 8.0 | 4.0 | 4.6 |
| $K_2O$ | 5.4 | 3.7 | 5.2 | 3.6 | 3.0 | 2.0 | 3.0 | 2.0 | 7.0 | 5.3 |
| $ZrO_2$ | | | 1.5 | 0.8 | | | | | 4.5 | 2.6 |
| MgO | | | | | | | | | 2.0 | 3.6 |
| CaO | | | | | | | | | 2.0 | 2.6 |
| SrO | | | | | | | | | 9.0 | 6.2 |
| BaO | | | | | | | | | 9.0 | 4.2 |
| $Li_2O/(Na_2O + K_2O)$ | | 0.34 | | 0.33 | | 0.83 | | 0.83 | | 0 |
| $(Li_2O + Al_2O_3)/(Na_2O + K_2O)$ | | 1 | | 1 | | 1.6 | | 1.6 | | 0.49 |
| $R'O/R_2O$ | 0 | | 0 | | 0 | | 0 | | 2 | |
| Density [g/cm$^3$] | | 2.43 | | 2.46 | | 2.43 | | 2.39 | | 2.82 |
| Ps [° C.] | | 468 | | 482 | | 443 | | 445 | | 582 |
| Ta [° C.] | | 515 | | 528 | | 486 | | 488 | | 628 |
| Ts [° C.] | | 756 | | 757 | | 699 | | 704 | | 837 |
| $10^4$ [° C.] | | 1190 | | 1179 | | 1092 | | 1106 | | 1150 |
| $10^3$ [° C.] | | 1429 | | 1410 | | 1313 | | 1334 | | 1311 |
| $10^{2.5}$ [° C.] | | 1593 | | 1564 | | 1458 | | 1489 | | 1411 |
| Thermal Expansion Coefficient [×10$^{-7}$/° C.] | | 85 | | 83 | | 86 | | 85 | | 84 |
| Liquidus Temperature E [° C.] | | 895 | | 950 | | 870 | | 870 | | 1005 |
| Liquidus Viscosity logη [dPa · s] | | 6 | | 5.5 | | 5.6 | | 5.7 | | 5.3 |
| Crack Incidence [%] | | 5 | | 30 | | 0 | | 0 | | 100 |
| Young's Modulus [GPa] | | 73 | | 75 | | 76 | | 75 | | 77 |
| Specific Young's Modulus [GPa/(g · cm$^3$)] | | 30.0 | | 31.0 | | 31.0 | | 32.0 | | 27.3 |
| Surface Compressive Stress [MPa] | | 520 | | 640 | | 530 | | 430 | | 390 |
| Depth of Compressive Stress Layer [μm] | | 30 | | 25 | | 20 | | 20 | | 15 |

TABLE 2

|  | 6 | | 7 | | 8 | | 9 | | 10 | |
|---|---|---|---|---|---|---|---|---|---|---|
|  | mass % | mol % | mass % | mol % | mass % | mol % | mass % | mol % | mass % | mol % |
| $SiO_2$ | 69.3 | 73.95 | 72.5 | 73.94 | 70.9 | 73.95 | 70.8 | 73.95 | 67.8 | 73.95 |
| $Al_2O_3$ | 13.8 | 8.67 | 14.4 | 8.67 | 14.1 | 8.67 | 14.1 | 8.67 | 13.5 | 8.67 |
| $B_2O_3$ | | | | | | | | | | |
| ZnO | | | | | | | | | | |
| $Sb_2O_3$ | | | | | | | | | | |
| $Li_2O$ | 2.0 | 4.33 | 4.2 | 8.67 | 4.1 | 8.67 | 2.1 | 4.33 | 2.0 | 4.33 |
| $Na_2O$ | 8.4 | 8.67 | 8.8 | 8.67 | 4.3 | 4.33 | 12.9 | 13.00 | 4.1 | 4.33 |
| $K_2O$ | 6.4 | 4.33 | | | 6.5 | 4.33 | | | 12.5 | 8.67 |
| $ZrO_2$ | | | | | | | | | | |
| MgO | | | | | | | | | | |
| CaO | | | | | | | | | | |
| SrO | | | | | | | | | | |
| BaO | | | | | | | | | | |
| $SnO_2$ | 0.1 | 0.05 | 0.1 | 0.05 | 0.1 | 0.05 | 0.1 | 0.05 | 0.1 | 0.05 |
| $Li_2O/(Na_2O + K_2O)$ | | 0.33 | | 1.00 | | 1.00 | | 0.33 | | 0.33 |
| $(Li_2O + Al_2O_3)/(Na_2O + K_2O)$ | | 1.0 | | 2.0 | | 2.0 | | 1.0 | | 1.0 |
| $R'O/R_2O$ | 0 | | 0 | | 0 | | 0 | | 0 | |
| Density [g/cm$^3$] | | 2.40 | | 2.39 | | 2.38 | | 2.40 | | 2.40 |
| Ps [° C.] | | 459 | | 462 | | 461 | | 469 | | 476 |
| Ta [° C.] | | 505 | | 506 | | 506 | | 514 | | 523 |
| Ts [° C.] | | 740 | | 726 | | 736 | | 738 | | 767 |
| $10^4$ [° C.] | | 1179 | | 1133 | | 1162 | | 1157 | | 1212 |
| $10^3$ [° C.] | | 1424 | | 1367 | | 1400 | | 1396 | | 1457 |

TABLE 2-continued

|  | 6 | | 7 | | 8 | | 9 | | 10 | |
|---|---|---|---|---|---|---|---|---|---|---|
|  | mass % | mol % | mass % | mol % | mass % | mol % | mass % | mol % | mass % | mol % |
| $10^{2.5}$ [° C.] | 1580 | | 1518 | | 1552 | | 1549 | | 1600 | |
| Thermal Expansion Coefficient [×$10^{-7}$/° C.] | 88 | | 77 | | 81 | | 82 | | 89 | |
| Liquidus Temperature E [° C.] | 920 | | 925 | | 950 | | 950 | | 1015 | |
| Liquidus Viscosity logη [dPa·s] | 5.7 | | 5.4 | | 5.6 | | 5.3 | | 5.2 | |
| Crack Incidence [%] | 5 | | 0 | | 0 | | 5 | | 5 | |
| Young's Modulus [GPa] | 73 | | 77 | | 76 | | 74 | | 70 | |
| Specific Young's Modulus [GPa/(g·cm³)] | 30.5 | | 32.4 | | 31.7 | | 30.8 | | 29.4 | |
| Surface Compressive Stress [MPa] | 480 | | 615 | | 520 | | 575 | | 325 | |
| Depth of Compressive Stress Layer [μm] | 32 | | 13 | | 20 | | 19 | | 39 | |

TABLE 3

|  | 11 | | 12 | |
|---|---|---|---|---|
|  | mass % | mol % | mass % | mol % |
| $SiO_2$ | 76.6 | 79.82 | 66.5 | 73.94 |
| $Al_2O_3$ | 8.1 | 5.71 | 13.2 | 8.67 |
| $B_2O_3$ | | | | |
| ZnO | | | | |
| $Sb_2O_3$ | | | | |
| $Li_2O$ | 1.8 | 3.57 | | |
| $Na_2O$ | 7.4 | 7.14 | 8.0 | 8.67 |
| $K_2O$ | 5.6 | 3.57 | 12.2 | 8.67 |
| $ZrO_2$ | | | | |
| MgO | | | | |
| CaO | | | | |
| SrO | | | | |
| BaO | | | | |
| $SnO_2$ | 0.5 | 0.19 | 0.1 | 0.05 |
| $Li_2O/(Na_2O + K_2O)$ | | 0.33 | | 0 |
| $(Li_2O + Al_2O_3)/(Na_2O + K_2O)$ | | 0.87 | | 0.50 |
| R'O/$R_2O$ | 0 | | 0 | |
| DENSITY [g/cm³] | 2.37 | | 2.41 | |
| Ps [° C.] | 447 | | 497 | |
| Ta [° C.] | 494 | | 545 | |
| Ts [° C.] | 733 | | 791 | |
| $10^4$ [° C.] | 1165 | | 1249 | |
| $10^3$ [° C.] | 1406 | | 1494 | |
| $10^{2.5}$ [° C.] | 1566 | | 1650 | |
| Thermal Expansion Coefficient [×$10^{-7}$/° C.] | 79 | | 93 | |
| Liquidus Temperature E [° C.] | <800 | | 970 | |
| Liquidus Viscosity logη [dPa·s] | >6.8 | | 5.8 | |
| Crack Incidence [%] | 5 | | 5 | |
| Young's Modulus [GPa] | 71 | | 67 | |
| Specific Young's Modulus [GPa/(g·cm³)] | 29.9 | | 27.8 | |
| Surface Compressive Stress [MPa] | 320 | | 350 | |
| Depth of Compressive Stress Layer [μm] | 36 | | 57 | |

Each of samples was prepared as follows. In the beginning, glass raw materials were blended so as to be a composition shown in Tables, followed by putting in a platinum pot and then melted at 1600° C. for 4 hr for sample Nos. 1 through 5 and at 1600° C. for 8 hr for sample Nos. 6 through 12. Thereafter, molten glass was flowed on a carbon plate to form it into plate. Planar glass thus obtained was evaluated in terms of various characteristics.

As a result, the glass plates of Nos. 1 through 4 and 6 through 11 had the density of 2.46 g/cm³ or less, strain point of 482° C. or less, thermal expansion coefficient in the range of 77×$10^{-7}$ to 89×$10^{-7}$/° C., crack incidence of less than 30% and Young's modulus of 70 GPa or more and found to be suitable for tempered glass. Furthermore, since these glass plates had the liquidus viscosity of $10^{5.2}$ dPa·s or more and the liquidus temperature of 1015° C. or less, the overflow downdraw process can be applied. Still furthermore, since these glass plates had the temperature at $10^{2.5}$ dPa·s of as low as 1600° C. or less, it is expected that a large amount of glass can be supplied at high productivity and at low cost.

The densities in the Tables were measured by use of a well-known Archimedes method.

The strain point Ps and the annealing point Ta were measured based on a method according to ASTM C336.

The softening point Ts was measured based on a method according to ASTM C338.

Temperatures at the viscosity of $10^{4.0}$, $10^{3.0}$ and $10^{2.5}$ dPa·s were measured by use of a platinum ball pull-up method.

As the thermal expansion coefficient, an average thermal expansion coefficient at the temperature in the range of 30 to 380° C. was measured by use of a dilatometer.

The liquidus temperature was measured in such a manner that glass was pulverized, followed by passing through a standard screen of 30 mesh (500 μm), glass powder remaining on a screen of 50 mesh (300 μm) was put in a platinum boat, followed by holding in a temperature gradient furnace for 24 hr, further followed by measuring a temperature where grains precipitate.

The liquidus viscosity shows the viscosity of each of glasses at the liquidus temperature. The higher the liquidus viscosity is and the lower the liquidus temperature is, the more excellent the devitrification and the formability are.

The crack incidence was measured as follows. In the beginning, in a thermostat of which the humidity is kept at 30% and a temperature is kept at 25° C., a Vickers indenter of which weight was set at 500 g was hit in for 15 sec on a glass surface (optical polished surface) and, at 15 sec after that, number of cracks generated from four corners of an indentation was counted (the maximum is set at four for one indentation). Thus, the indenter was hit in 20 times, a total number of generated cracks was obtained, followed by obtaining the crack incidence from an equation of total number of generated cracks/80×100.

The Young's modulus was measured by use of an oscillation method.

Subsequently, both surfaces of each of the planar glasses were subjected to optical polishing, followed by applying an ion exchange process. The ion exchange process was carried out by dipping a sample in molten $KNO_3$ salt at 430° C. for 4 hr for glasses of Nos. 1 through 4 and 6 through 12. The glass of sample No. 5 was ion exchanged by dipping in molten $KNO_3$ salt at 470° C. for 4 hr. After a surface of each of treated samples was washed, a compressive stress value of a surface and a depth of the compressive stress layer were read by use of a surface stress meter (trade name: FSM-60, produced by Toshiba Corporation).

As a result, it was found that, in all samples of Nos. 1 through 4 and 6 through 11, that are examples of the invention, the compressive stress of 320 MPa or more was generated on a surface thereof and the depth thereof was deep such as 13 µm or more.

The examples were carried out at a laboratory level. Accordingly, a glass plate was formed according to a flow out method and optical polishing was applied before the ion exchange process. However, in the case of applying in an industrial scale, it is desirable that a thin sheet having a thickness of 1.5 mm or less is formed according to an overflow downdraw process, followed by cutting into a predetermined size, further followed by edge-dressing, still further followed by subjecting to the ion exchange process in a state where a main surface is non-polished.

While the present invention has been described in detail and with reference to specific embodiments thereof, it will be apparent to one skilled in the art that various changes and modifications can be made without departing from the spirit and scope thereof.

The present application is based on Japanese Patent Application No. 2006-145375 filed on May 25, 2006, and the contents thereof are incorporated herein by reference.

What is claimed is:

1. A tempered glass comprising, in terms of mass percent,
   $SiO_2$: 60 to 80%;
   $Al_2O_3$: 3 to 18%;
   $B_2O_3$: 0 to 7%;
   $Li_2O$: 0.01 to 10%;
   $Na_2O$: 4 to 16%;
   $K_2O$: 0 to 15%; and
   R'O (wherein R'O indicates a total content of alkaline earth metal oxides): 0 to 5%,
   wherein a value of $(Li_2O)/(Na_2O+K_2O)$ in terms of molar ratio is within a range of 0.05 to 0.5,
   wherein a surface of the tempered glass is treated to form a compressive stress layer, and
   wherein a liquidus viscosity is $10^{5.0}$ dPas or more.

2. A tempered glass comprising, in terms of mass percent,
   $SiO_2$: 60 to 80%;
   $Al_2O_3$: 8 to 18%;
   $B_2O_3$: 0 to 5%;
   $Li_2O$: 0.01 to 10%;
   $Na_2O$: 4 to 14%;
   $K_2O$: 0.01 to 10%; and
   R'O (wherein R'O indicates a total content of alkaline earth metal oxides): 0 to 5%,
   wherein a value of $(Li_2O)/(Na_2O+K_2O)$ in terms of molar ratio is within a range of 0.05 to 0.5,
   wherein a surface of the tempered glass is treated to form a compressive stress layer, and
   wherein a liquidus viscosity is $10^{5.0}$ dPas or more.

3. The tempered glass according to claim 1, which has a compressive stress layer of 300 MPa or more formed on a surface thereof, said compressive stress layer having a thickness of 5 µm or more.

4. The tempered glass according to claim 1, wherein the tempered glass is made of a glass having a liquidus temperature of 1050° C. or less.

5. The tempered glass according to claim 1, which has a non-polished surface.

6. The tempered glass according to claim 1, which has a plate thickness of 1.5 mm or less.

7. A process for producing a tempered glass, comprising:
   melting glass raw materials blended so as to have a glass composition within a range of, in terms of mass percent, $SiO_2$: 60 to 80%, $Al_2O_3$: 3 to 18%, $B_2O_3$: 0 to 7%, $Li_2O$: 0.01 to 10%, $Na_2O$: 4 to 16%, $K_2O$: 0 to 15% and R'O (wherein R'O expresses a total content of alkaline earth metal oxides): 0 to 5%, wherein a ratio of $(Li_2O)/(Na_2O+K_2O)$ in terms of molar ratio is within a range of 0.05 to 0.5, followed by forming them into sheet; and then
   conducting an ion exchange process to form a compressive stress layer on a surface of said glass sheet,
   wherein the glass has a liquidus viscosity of $10^{5.0}$ dPas or more.

8. The process for producing a tempered glass according to claim 7, wherein the glass raw materials are formed into sheet by an overflow downdraw process.

9. A glass comprising: in terms of mass percent,
   $SiO_2$: 60 to 80%;
   $Al_2O_3$: 3 to 18%;
   $B_2O_3$: 0 to 7%;
   $Li_2O$: 0.01 to 10%;
   $Na_2O$: 4 to 16%;
   $K_2O$: 0 to 15%; and
   R'O (wherein R'O indicates a total content of alkaline earth metal oxides): 0 to 5%,
   wherein a value of $(Li_2O)/(Na_2O+K_2O)$ in terms of molar ratio is within a range of 0.05 to 0.5, and
   wherein a liquidus viscosity is $10^{5.0}$ dPas or more.

10. The tempered glass according to claim 2, which has a compressive stress layer of 300 MPa or more formed on a surface thereof, said compressive stress layer having a thickness of 5 µm or more.

11. The tempered glass according to claim 2, wherein the tempered glass is made of a glass having a liquidus temperature of 1050° C. or less.

12. The tempered glass according to claim 2, which has a non-polished surface.

13. The tempered glass according to claim 2, which has a plate thickness of 1.5 mm or less.

14. The tempered glass according to claim 1, wherein the liquidus viscosity is $10^{5.3}$ dPas or more.

15. The tempered glass according to claim 2, wherein the liquidus viscosity is $10^{5.3}$ dPas or more.

16. The tempered glass according to claim 7, wherein the liquidus viscosity is $10^{5.3}$ dPas or more.

17. The tempered glass according to claim 9, wherein the liquidus viscosity is 1 dPas or more.

* * * * *